(12) United States Patent
Reddy et al.

(10) Patent No.: US 10,511,245 B2
(45) Date of Patent: Dec. 17, 2019

(54) APPARATUS AND METHOD FOR SENSORLESS DETECTION OF LOAD TORQUE OF A STEPPER MOTOR AND FOR OPTIMIZING DRIVE CURRENT FOR EFFICIENT OPERATION

(71) Applicant: Microsemi SoC Corp., San Jose, CA (US)

(72) Inventors: Battu Prakash Reddy, Hyderabad (IN); Ashwin Murali, Hyderabad (IN)

(73) Assignee: Microsemi SoC Corp., San Jose, CA (US)

( * ) Notice: Subject to any disclaimer, the term of this patent is extended or adjusted under 35 U.S.C. 154(b) by 0 days.

(21) Appl. No.: 16/180,751

(22) Filed: Nov. 5, 2018

(65) Prior Publication Data

US 2019/0190424 A1 Jun. 20, 2019

(30) Foreign Application Priority Data

Dec. 20, 2017 (IN) .............................. 201721045919

(51) Int. Cl.
*H02P 21/22* (2016.01)
*H02P 25/03* (2016.01)

(52) U.S. Cl.
CPC .............. *H02P 21/22* (2016.02); *H02P 25/03* (2016.02)

(58) Field of Classification Search
CPC .. H02P 21/00; H02P 21/22; H02P 8/00; H02P 1/00; H02P 1/04; H02P 1/46; H02P 3/00; H02P 3/18; H02P 1/54; H02P 5/00; H02P 11/00; H02P 23/00; H02P 27/00; H02P 27/04; H02P 27/06; H02P 6/00; H02P 6/14; F04D 15/00; G05B 19/40
USPC ..... 318/685, 696, 400.01, 400.02, 700, 701, 318/721, 727, 799, 800, 801, 430, 432
See application file for complete search history.

(56) References Cited

U.S. PATENT DOCUMENTS

| 5,587,641 | A | 12/1996 | Rozman |
| 6,900,657 | B2 | 5/2005 | Bui et al. |
| 7,019,484 | B2 * | 3/2006 | Takemori ................. H02P 8/16 318/685 |
| 7,224,140 | B2 | 5/2007 | Arefeen et al. |
| 8,058,894 | B2 | 11/2011 | De et al. |
| 8,564,230 | B2 | 10/2013 | Dwersteg et al. |
| 8,604,744 | B2 | 12/2013 | Takai et al. |
| 2001/0006335 | A1 | 7/2001 | Kondou et al. |

(Continued)

FOREIGN PATENT DOCUMENTS

KR 20150002919 1/2015

OTHER PUBLICATIONS

International Search Report and Written Opinion, PCT/US2018/063484, dated Feb. 19, 2019.

(Continued)

*Primary Examiner* — Antony M Paul
(74) *Attorney, Agent, or Firm* — Glass and Associates; Kenneth D'Alessandro; Kenneth Glass (57) ABSTRACT

A method for controlling the drive current in a stepper motor includes measuring stepper motor current, computing a load angle of the stepper motor, calculating a torque ratio of the stepper motor, generating a reference current as a function of the torque ratio and a maximum current setting for the stepper motor, and setting the drive current of the stepper motor as a function of the reference current.

7 Claims, 5 Drawing Sheets

(56) References Cited

U.S. PATENT DOCUMENTS

2006/0273747 A1   12/2006   Takeuchi
2009/0066274 A1    3/2009   Liu et al.
2011/0056005 A1    3/2011   Baumoel
2011/0057590 A1    3/2011   Flanary et al.
2012/0153886 A1    6/2012   Dwersteg et al.
2014/0285124 A1    9/2014   Derammelaere et al.
2017/0346426 A1   11/2017   Reddy

OTHER PUBLICATIONS

"NCV70514 Micro-stepping Motor Driver", Data Sheet, ON Semiconductor, Denver, Colorado 80217, Sep. 2017.
Rakesh, et al., "How AutoTuneTM regulates current in stepper motors", Texas Instruments, Dallas, Texas 75265, Jun. 2016.
"A Robust Method for Stepper Motor Stall Detection", Technosoft International SRL, The 5th International Symposium on Advanced Topics in Electrical Engineering, Bucharest, Romania, IEEE 978-1-4673-1/13, May 23-25, 2013.

\* cited by examiner

APPARATUS AND METHOD FOR SENSORLESS DETECTION OF LOAD TORQUE OF A STEPPER MOTOR AND FOR OPTIMIZING DRIVE CURRENT FOR EFFICIENT OPERATION

BACKGROUND

The present invention relates to control of stepper motors. More particularly, the present invention relates to apparatus and method for sensorless detection of load torque of a stepper motor and for optimizing drive current for efficient operation.

Stepper motors are used for position control and are designed to operate in open loop (no position feedback). Their inherent stepping ability allows for accurate positioning without feedback.

A stepper motor is usually run at a constant current and the current setting needs to be tuned according to the load conditions of the application in which it is used. The objective of the current setting is to run the stepper motor as cool as possible while ensuring that no steps are skipped (slipping) during operation.

In most situations a stepper motor is operated with motor current that is considerably higher than the actual motor load, i.e., the motor is operated having a torque reserve that is much too high. This leads to excessive current flowing through the motor windings, leading to unnecessary heating of the motor. To arrive at an optimum current level that provides enough torque to avoid slipping, multiple tries based on trial and error are used. In general, a safety margin is provided in the current setting so that the torque equivalent to current setting (i.e., the torque produced by the motor when a current equivalent to the current setting flows through the motor) is sufficiently greater than the load torque (i.e., the torque experienced by the motor from the load) to avoid slipping.

The load torque profile of a stepper motor is not always flat and can have peak torque under certain conditions. The current setting used also depends on the motor speed, higher current being required for higher speed. If the current is set to compensate for peak load torque, it may be too high for other load conditions. This leads to higher power consumption and reduced efficiency. Also, selection of motor power rating will depend on the peak load torque profile.

Figure 1:
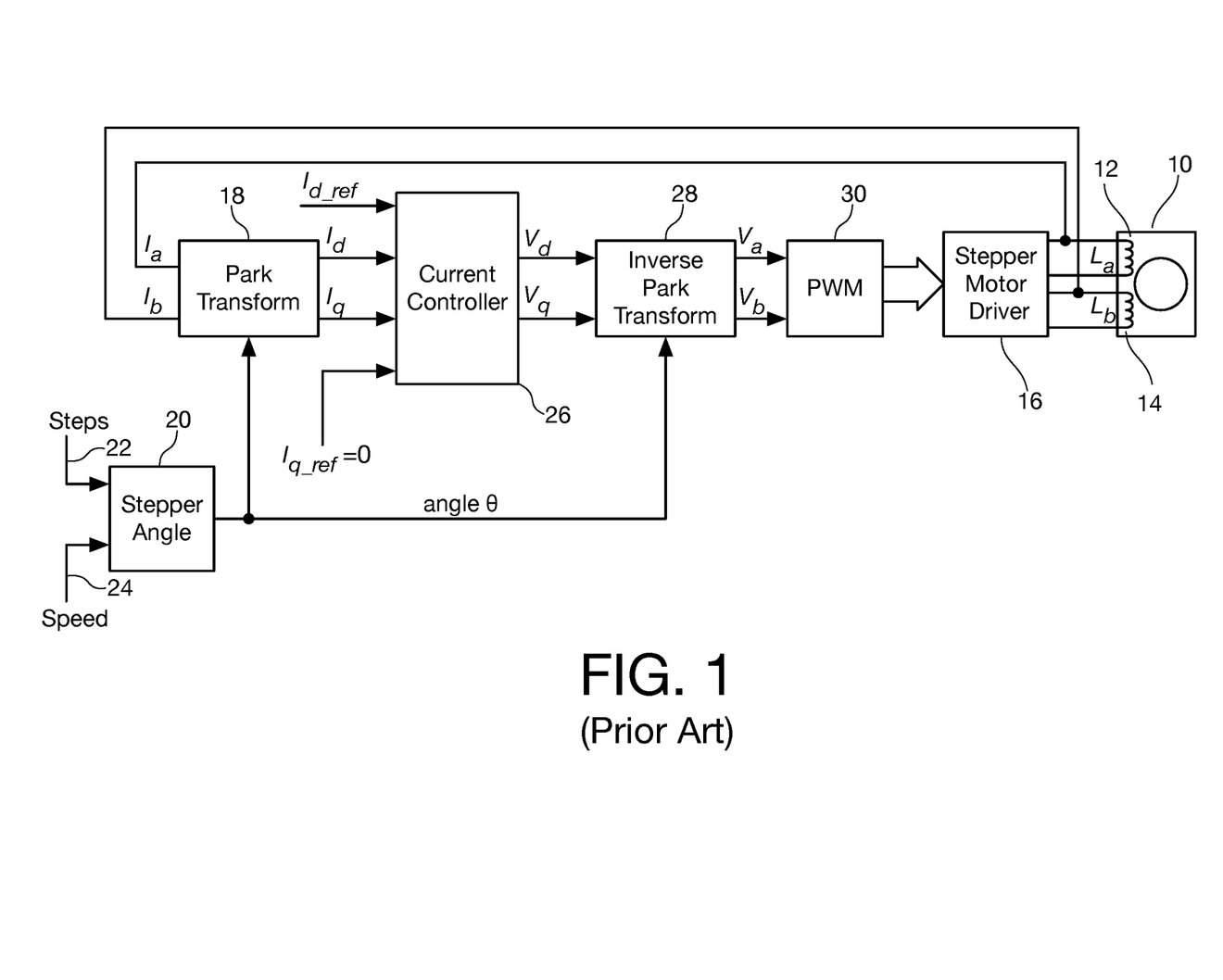
FIG. 1 is a block diagram of one prior-art method called vector control that is used to control a stepper motor in open loop.

One known way to control a stepper motor in open loop is called vector control and is illustrated in FIG. 1. The stepper motor 10 consists of two coils $L_a$ (12) and $L_b$ (14), which are driven by a stepper motor driver 16. The actual currents $I_a$ and $I_b$ flowing in the coils $L_a$ (12) and $L_b$ (14) are measured using conventional current-measuring techniques and are transformed from the stationary domain to calculated currents $I_d$ and $I_q$ in the d-q domain based on the imposed angle θ using the well-known Park transform as indicated at reference numeral 18. As is known in the art, the imposed angle θ is generated by the "stepper angle" module 20 based on the desired number of steps and speed presented to inputs 22 and 24, respectively.

A current controller 26 operates by computing $V_d$ and $V_q$ from the calculated currents $I_d$ and $I_q$. The reference current $I_{q\_ref}$ is always set to 0 and the reference current $I_{d\_ref}$ is set based on a maximum expected load torque value. The voltages $V_d$ and $V_q$ are then transformed into stationary domain by calculating voltages $V_a$ and $V_b$ at reference numeral 28 using an inverse Park transform. A pulse-width-modulation (PWM) module 30 is used to generate drive signals that impose calculated voltages $V_a$ and $V_b$ through the stepper motor driver 16. The rotor of the stepper motor moves through command steps at the commanded speed. As indicated above, the "stepper angle" module 20 generates the imposed angle θ based on steps and speed commands set by the user. Each step corresponds to 90 degrees of angle and the rate of change of angle is dependent on the speed. The stepper angle circuit generates angle θ output by integrating the speed input 24 over time. The integration is halted when the angle θ corresponding to the input command steps 22 is reached. The relation between angle θ and the input command steps 22 is given by:

$$θ=(command\_steps*π)/2$$

The actual motor coil currents are transformed into a rotating reference frame designated d-q at reference numeral 18 using a Park transform based on imposed angle θ according to the equations $$I_d=I_a \cos θ+I_b \sin θ$$

$$I_q=-I_a \sin θ+I_b*\cos θ$$

The voltages $V_d$ and $V_q$ are transformed from the d-q reference frame to voltages in the stationary domain at reference numeral 28 by calculating voltages $V_a$ and $V_b$ using an inverse Park transform based on the angle θ according to the equations $$V_a=V_d \cos θ-V_q \sin θθ$$

$$V_b=V_d \sin θ+V_q \cos θ$$

The current controller 26 forces the calculated currents $I_d$ and $I_q$ to follow reference currents $I_{d\_ref}$ and $I_{q\_ref}$ by calculating $V_d$ and $V_q$. A PI controller is a simple and widely used form of controller and is suitable for this purpose.

The PWM module 30 compares the input reference signal with a higher frequency modulator signal and generates a pulsed output whose average value is equivalent to the input reference.

The stepper driver 16 imposes driving voltages on stepper coils $L_a$ and $L_b$ based on signals from PWM module 26. Ultimately, the above solution provides a drive current based on the fixed reference current $I_{d\_ref}$ which is based on the maximum expected load torque value. The reference current is thus not dynamic, and leads to wasted energy.

BRIEF DESCRIPTION

A method is proposed to detect the load torque of a stepper motor and dynamically adjust the current to get best efficiency. The load torque is detected without using any sensor, based on motor voltage, current, resistance and inductance. Stepper motor current is calculated from the load torque. The proposed method may be implemented as an IP in a field programmable gate array (FPGA).

The invention improves the efficiency of a stepper motor drive by optimizing the current. With the present invention, the motor will run cooler due to reduced heat dissipation and reduce or eliminate the need for forced cooling. This will also reduce the size and cost of the motor for an application.

BRIEF DESCRIPTION OF THE DRAWING FIGURES

The invention will be explained in more detail in the following with reference to embodiments and to the drawing in which are shown.

DETAILED DESCRIPTION

Persons of ordinary skill in the art will realize that the following description of the present invention is illustrative only and not in any way limiting. Other embodiments of the invention will readily suggest themselves to such skilled persons.

Figure 2:
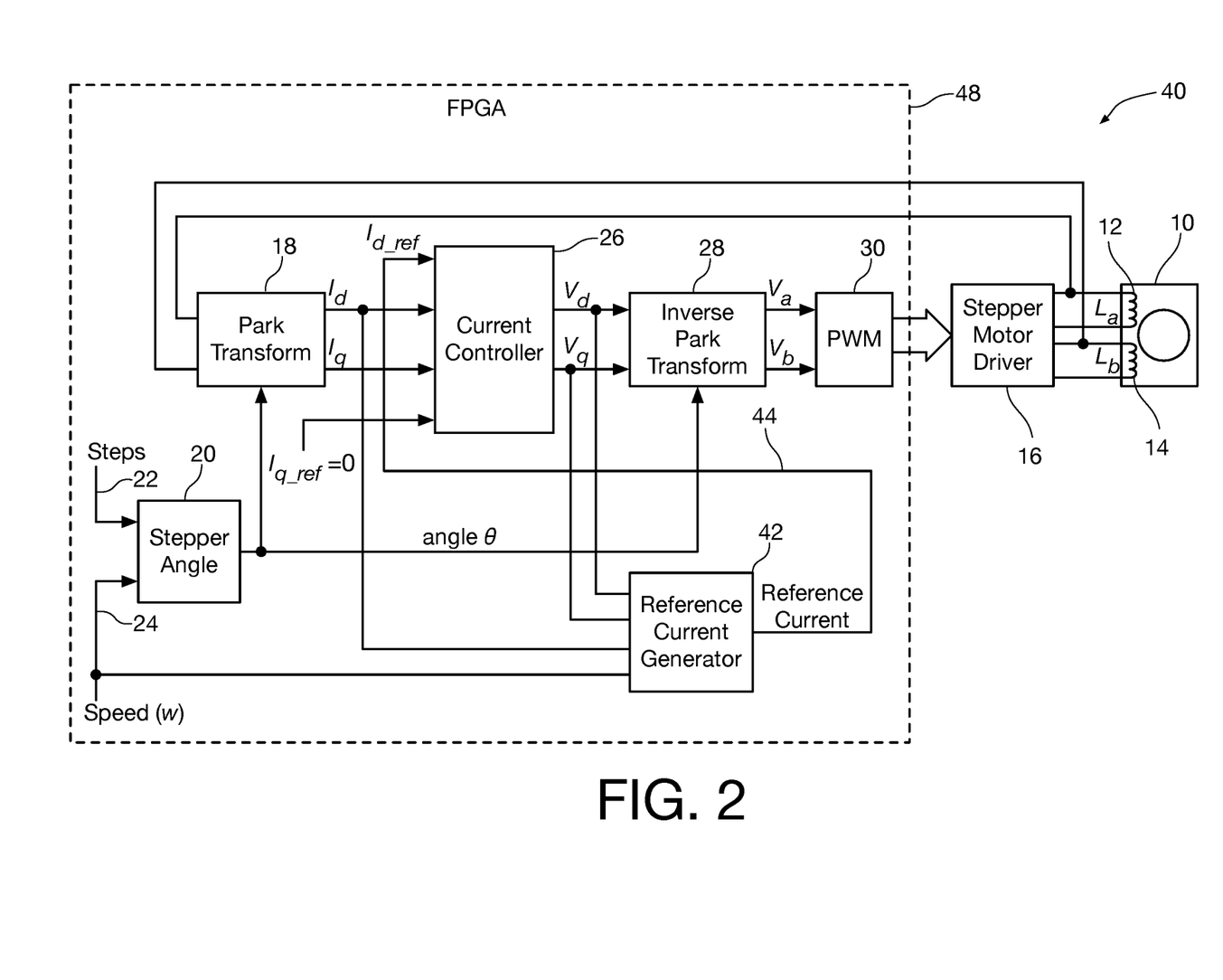
FIG. 2 is a block diagram illustrating apparatus to perform sensorless detection of load torque of a stepper motor and to dynamically adjust drive current for efficient operation in a vector control system that is used to control the stepper motor operating in open loop in accordance with the present invention.

Referring now to FIG. 2, a block diagram illustrates an apparatus 40 configured to perform sensorless detection of load torque of a stepper motor and to dynamically adjust drive current for efficient operation in a vector control system that is used to control the stepper motor operating in open loop in accordance with the present invention. Some of the elements depicted in FIG. 2 are also present in the system shown in FIG. 1. These elements will be referred to in FIG. 2 using the same reference numerals that are used to designate their counterparts in FIG. 1.

As in the system depicted in FIG. 1, the stepper motor 10 consists of two coils $L_a$ (12) and $L_b$ (14), which are driven by a stepper motor driver 16. The actual currents $I_a$ and $I_b$ flowing in the coils $L_a$ (12) and $L_b$ (14) are measured using conventional current-measuring techniques, such as an in-line resistor or a Hall sensor, and are transformed from the stationary domain to calculated currents $I_d$ and $I_q$ in the d-q domain based on the imposed angle θ using the Park transform as indicated at reference numeral 18. As is known in the art, the imposed angle θ is generated by the "stepper angle" module 20 based on the desired number of steps and desired speed presented to inputs 22 and 24, respectively. The stepper angle module 20 generates angle θ output by integrating the speed input 24 over time. The integration is halted when the angle θ corresponding to the input command steps 22 is reached. The relation between angle θ and the input command steps 22 is given by:

$$θ=(command\_steps*π)/2$$

The current controller 26 regulates the transformed currents $I_d$ and $I_q$ by calculating $V_d$ and $V_q$. The reference current $I_{q\_ref}$ is always set to 0 and the reference current is generated dynamically by a reference current generator module 42. The voltages $V_d$ and $V_q$ are then transformed into calculated voltages $V_a$ and $V_b$ at reference numeral 28 using an inverse Park transform. A pulse-width-modulation (PWM) module 30 is used to generate drive signals that impose voltages calculated $V_a$ and $V_b$ through the stepper motor driver 16. The rotor of the stepper motor moves through command steps at the commanded speed. The "stepper angle" module 20 generates the imposed angle θ based on steps and speed commands set by the user. Each step corresponds to 90 degrees of angle and the rate of change of angle is dependent on the speed.

The currents $I_a$ and $I_b$ are transformed into a rotating reference frame designated d-q at reference numeral 18 by calculating currents $I_q$ and $I_d$ using a Park transform based on imposed angle θ according to the equations $$I_d=I_a \cos θ+I_b \sin θ$$

$$I_q=-I_a \sin θ+I_b*\cos θ$$

The voltages $V_d$ and $V_q$ are transformed from the d-q reference frame to voltages in the stationary domain at reference numeral 28 by calculating voltages $V_a$ and $V_b$ using an inverse Park transform based on the imposed angle θ according to the equations:

$$V_a=V_d \cos θ-V_q \sin θθ$$

$$V_b=V_d \sin θ+V_q \cos θ$$

The current controller 26 forces the currents $I_d$ and $I_q$ to follow reference currents $I_{d\_ref}$ and $I_{q\_ref}$ by calculating $V_d$ and $V_q$. A PI controller is a simple and widely used form of controller and is suitable for this purpose.

The PWM module 30 compares the input reference signal with a higher frequency modulator signal and generates a pulsed output whose average value is equivalent to the input reference.

The stepper driver 16 imposes driving voltages on stepper coils $L_a$ and $L_b$ based on signals from PWM module 30.

According to the present invention, the load angle δ is computed based on measured voltages and currents and is used to calculate the reference current value by reference current generator module 42. The voltage equations of the stepper motor in d-q domain are:

$$Vd=I_dR-I_qLw+KNw \sin δ \quad \text{eq. (1)}$$

$$Vq=I_qR+I_dLNw+Nw \cos δ \quad \text{eq. (1)}$$

Where:
N=Number of teeth in the stepper motor
w=Rotor speed
R=Resistance of the stepper motor coils
L=Inductance of the stepper motor coils
K=Back-emf constant of the stepper motor
δ=Load angle which is the angle between rotor magnetic field and stator current For stepper motor control, $I_q$ is forced to zero, so the above equations can be simplified as:

$$KNw \sin δ=V_d-I_dR \quad \text{eq. (3)}$$

$$KNw \cos δ=V_q-I_dLNw \quad \text{eq. (4)}$$

The load angle δ can be found from above equations using an inverse tangent, through a look up table, or a CORDIC algorithm, responsive to the inputs $I_d$, $L_q$ and $V_d$, as:

$$δ=\tan^{-1}(Knw \sin δ/KNw \cos δ) \quad \text{eq. (5)}$$

Reference current generator module 42 solves eq. (3), eq. (4), and eq. (5), and determines the value of the reference current. The value of δ computed from the above equation is used to set the value of the output reference current $I_{d\_ref}$ of reference current generator module 42, which is fed to current controller 26 in place of the fixed reference of the prior art. All of the elements of apparatus 40, with the exception of stepper motor driver 16 and stepper motor 10 are in embodiment implemented in an FPGA 48.

Figure 3:
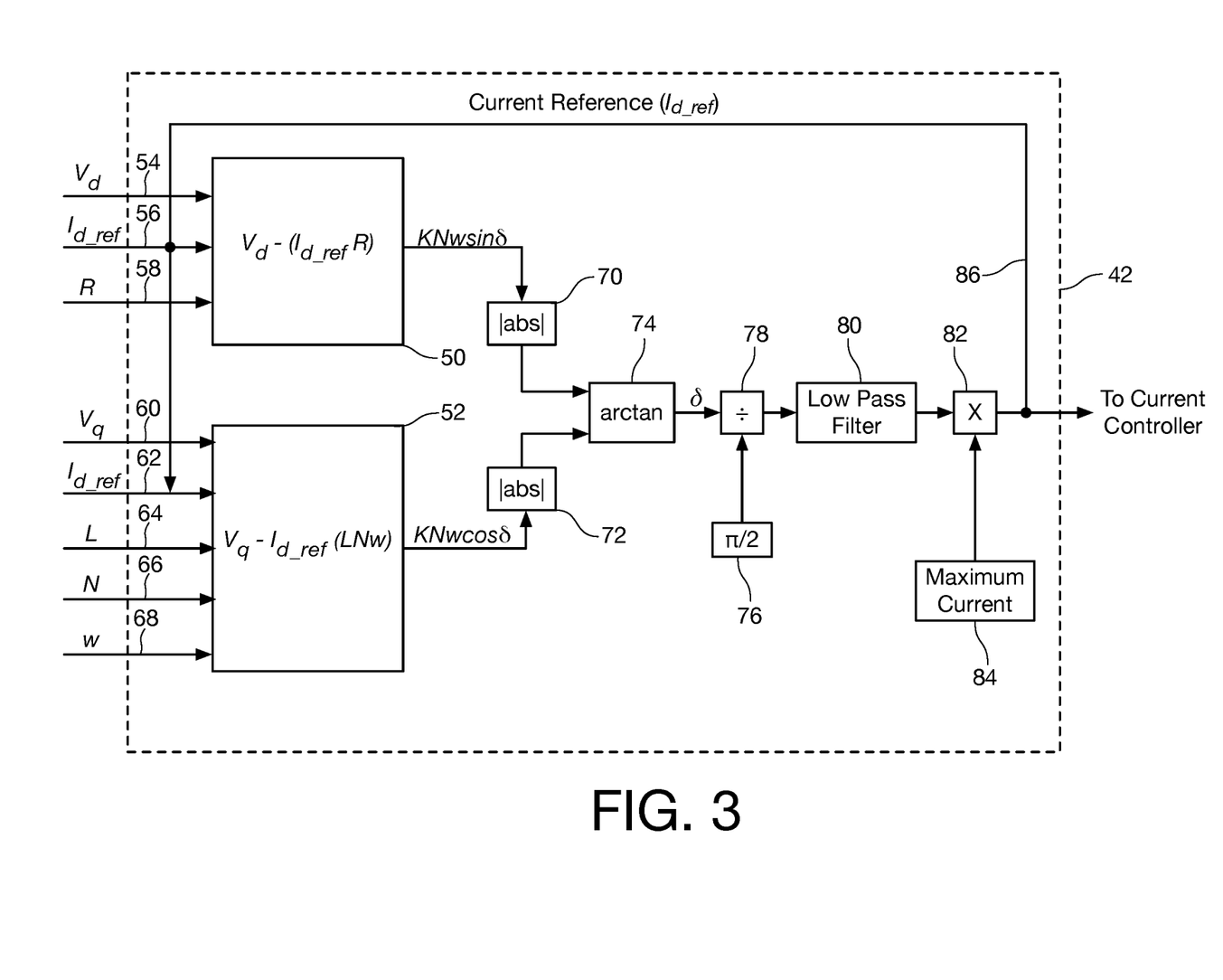
FIG. 3 is a block diagram showing an illustrative embodiment of a current reference generator block in the apparatus of FIG. 2.

Referring now to FIG. 3, a block diagram shows an illustrative embodiment of the reference current generator module 42 in the apparatus of FIG. 2.

The reference current generator module 42 computes the value of the reference current $I_{d\_ref}$. Equation (3) is implemented in sine term calculator block 50 and equation (4) is implemented in cosine term calculator block 52 to find, respectively, the sine and cosine terms.

The calculated voltage and current $V_d$, $I_{d\_ref}$, and the resistance R of the stepper coils are presented to sine term calculator 50 on lines 54, 56, and 58, respectively. The value R is a constant characteristic of the stepper motor 10 being controlled, and is thus supplied from a register value set during initial setup or design. The terms $V_q$, $I_{d\_ref}$, L, N, and w are presented to cosine term calculator 52 on lines 60, 62, 64, 66, and 68, respectively, with L and N being supplied from a register value set during initial setup or design and $I_{d\_ref}$ being presented as a feedback from the output of reference current generator module 42. The values L and N are constants characteristic of the stepper motor 10 being controlled, and w is the desired speed command 24 in FIG. 2. As will be appreciated by persons of ordinary skill in the art, sine term calculator 50 and cosine term calculator 58 can easily be configured from arithmetic circuits that are readily implementable in the FPGA 48.

Absolute value blocks 70 and 72 convert any negative sine and cosine values, respectively, to positive values, and then an inverse tangent is used to find the load angle δ in arctan block 74. The load angle δ output from arctan block 74 is divided by the quantity π/2 (90°) provided at reference numeral 76 in division block 78 to obtain the ratio of load torque with respect to rated motor torque (torque ratio). As will be appreciated by persons of ordinary skill in the art, arctan calculator 70 can easily be configured from arithmetic circuits that are readily implementable in the FPGA 48.

The torque ratio output from division block 78 is passed through a low pass filter 80 to remove noise. The filtered torque ratio is multiplied at multiplier 82 by a "Maximum current" value setting provided at reference numeral 84 to obtain a current reference representing the current required to meet the load torque on line 86. The Maximum current value setting at reference numeral 84 is set by the user and depends on the application. According to one embodiment of the invention, the value is set to the rated current of the motor. As the current controller module 26 in FIG. 2 forces the actual current to follow the reference current, the reference current $I_{d\_ref}$ is used in place of a fixed $I_d$ in equations (3) and (4).

The reference current generator module 42 automatically calculates the current required to meet the present load torque. It makes sure only a dynamically calculated current, responsive to the present load, is supplied to the motor instead of driving the motor with maximum current under all load conditions.

The proposed apparatus and method of the present invention is in one embodiment implemented in FPGA 48 because of the simplicity of the equations involved. Persons of ordinary skill in the art will recognize that the present invention is not limited to the use of FPGA devices, but is also applicable to micro-controller or DSP solutions.

Figure 4:
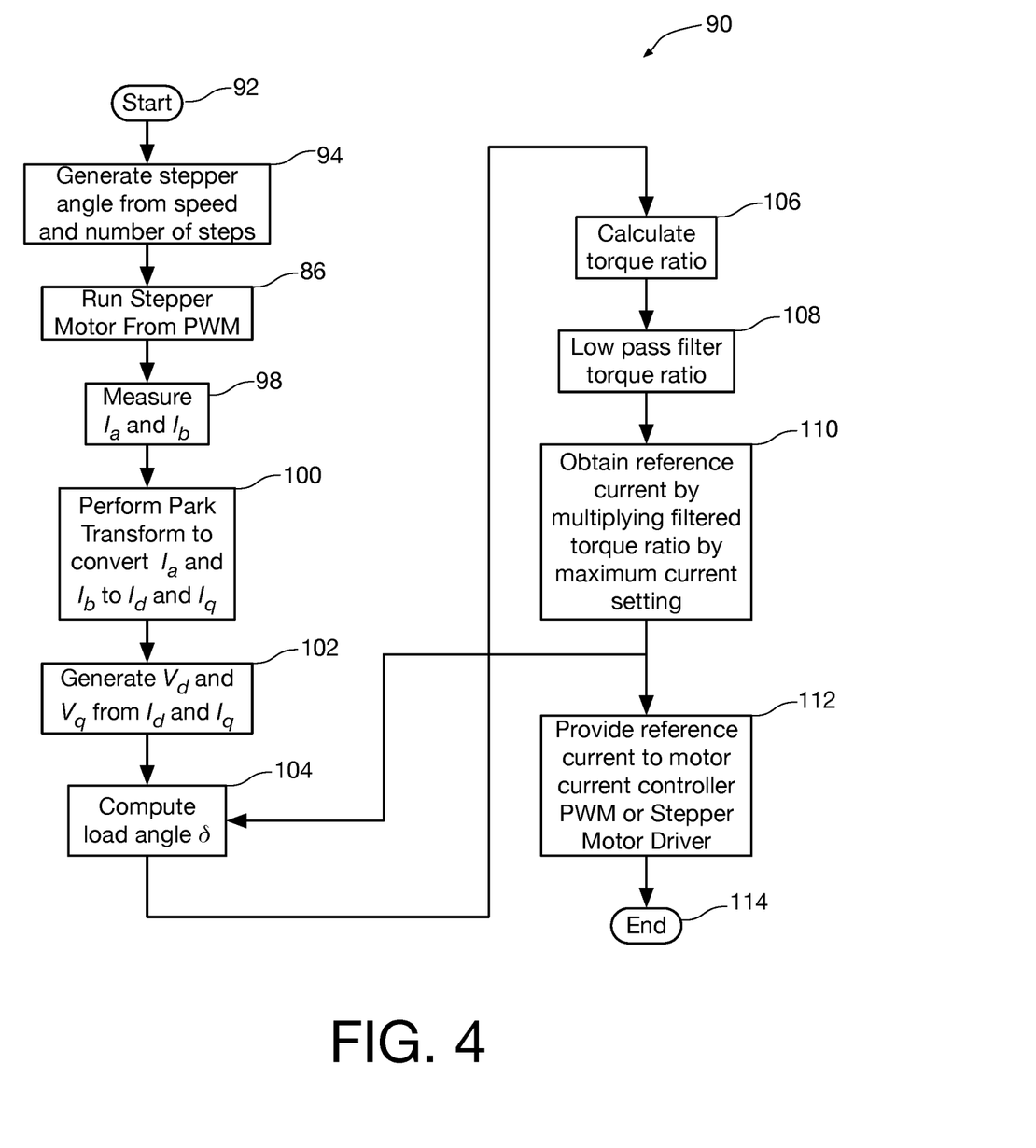
FIG. 4 is a flow diagram showing an illustrative method for performing sensorless detection of load torque of a stepper motor and for dynamically adjusting drive current for efficient operation of a stepper motor in a vector control system that is used to control the stepper motor operating in open loop in accordance with the present invention.

Referring now to FIG. 4, a flow diagram shows an illustrative method 90 for dynamic computation of current setting of a stepper motor in a vector control system that is used to control the stepper motor operating in open loop in accordance with the present invention. The method starts at reference numeral 92.

At reference numeral 94, a stepper angle is generated from the speed w and number of steps input by the user. At reference numeral 96, the stepper motor is run from the PWM module 30. At reference numeral 98 currents $I_a$ and $I_b$ are measured and converted to values. At reference numeral 100, the Park transform is used to convert the values of the measured currents $I_a$ and $I_b$ to values $I_d$ and $I_q$. At reference numeral 102, the voltage values $V_d$ and $V_q$ are generated from the current values $I_d$ and $I_q$. At reference numeral 104, the load angle δ is calculated. At reference numeral 106, the torque ratio is calculated, responsive to the voltage values $V_d$ and $V_q$ and value $I_d$. At reference numeral 108 the torque ratio is passed through low pass filtered to remove noise. At reference numeral 110, the reference current value $I_{d\_ref}$ is calculated by multiplying the filtered torque ratio by the "Maximum current" value. At reference numeral 112 the calculated reference current value $I_{d\_ref}$ is provided to the motor current controller (reference numeral 26 in FIG. 2). It is noted that the reference current value $I_{d\_ref}$ is also provided to the computation at reference numeral 104 of the load angle δ. The method then ends at reference numeral 114. As an example of the operation of the apparatus and method of the present invention, assume that the motor is operating at 10% load torque and changes to 50% load torque after some time duration.

Figure 5A:
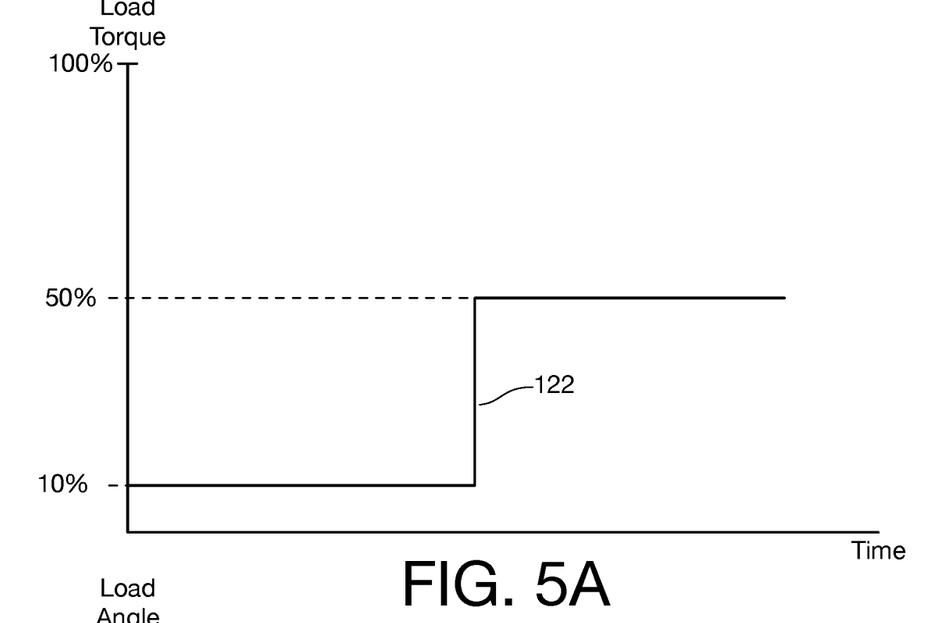
FIG. 5A is a graph that illustrates load torque as a function of time.
Figure 5B:
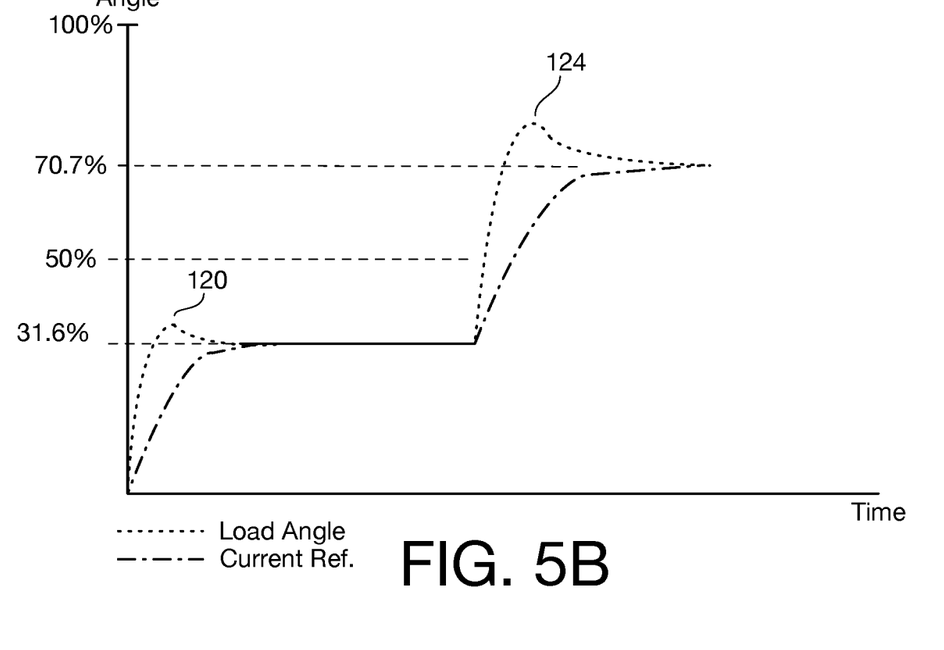
FIG. 5B is a graph that illustrates a typical response to motor load torque change based on the calculations set forth in the embodiments disclosed herein.

Referring now to FIG. 5A a graph that shows load torque as a function of time. FIG. 5B illustrates a response of the present embodiments to the change in the load torque of FIG. 5A at load torque values of 10% and 50%.

The graph of FIG. 5A shows a case where the motor is starting with 10% of maximum expected load torque. At the time of starting, the computed load angle and the current reference will be zero for the first instance of computation as shown in FIG. 5B. After startup, as the stepper angle computed in the stepper angle module 20 of FIG. 2 increases, the load angle increases and the current reference increases with a delay introduced by the low pass filter as shown in FIG. 5B. The response time can be configured by changing the time constant of the low pass filter.

The stepper motor does not rotate until the current reference value is greater than current required to overcome the load torque. As a result the computed load angle continues to increase. When the current reference value increases above the value equivalent to the load torque, the stepper motor starts to rotate and the load angle starts to decrease as shown at reference numeral 120 in FIG. 5B. The current reference reaches a stable value when the percentage of computed load angle value equals the percentage of current reference value, which in the case illustrated in FIGS. 5A and 5B is 31.6%.

When the load torque undergoes a step change from 10% to 50% as shown at reference numeral 122 in FIG. 5A, the load angle starts to increase as the current reference value of 31.6% is less than the current equivalent to load torque of 50%. The increase in load angle again leads to an increase of current reference value with a delay due to low pass filter. When the current reference value increases over 50%, the load angle starts to decrease as shown at reference numeral 124 in FIG. 5B. The current reference reaches a stable value when the percentage of computed load angle value equals the percentage of current reference value, which in the case of 50% load torque is 70.7% as shown in FIGS. 5A and 5B.

While embodiments and applications of this invention have been shown and described, it would be apparent to those skilled in the art that the above example is just one of many possible cases and that many more modifications than mentioned above are possible without departing from the inventive concepts herein. The invention, therefore, is not to be restricted except in the spirit of the appended claims.

What is claimed is:

1. A method for controlling the drive current in a stepper motor comprising:
   measuring a stepper motor current;
   computing a load angle of the stepper motor;
   calculating a torque ratio of the stepper motor;
   generating a reference current as a function of the calculated torque ratio and a maximum current setting for the stepper motor; and
   setting the drive current of the stepper motor as a function of the generated reference current.

2. The method of claim 1 wherein the load angle is computed using motor voltage, current, resistance, and inductance.

3. The method of claim 1, wherein calculating a torque ratio of the stepper motor comprises calculating a low-pass filtered torque ratio of the stepper motor.

4. A method for operating a stepper motor comprising:
   generating a stepper angle from the speed and number of steps input by the user;
   running the stepper motor using signals from a pulse width modulator through a stepper motor driver;
   measuring currents from coils in the stepper motor;
   converting the measured currents to currents in a d-q domain;
   calculating voltage values in the d-q domain from the currents in the d-q domain;
   converting the voltages in the d-q-domain to voltage values in a stationary domain;
   calculating a load angle of the stepper motor;
   calculating a torque ratio of the stepper motor;
   determining a reference current value as a function of the calculated torque ratio and a maximum current setting for the stepper motor; and
   setting the drive current of the stepper motor as a function of the determined reference current.

5. The method of claim 4 wherein converting the measured currents to currents in a d-q domain comprises converting the measured currents to currents in a d-q domain using a Park transform.

6. The method of claim 4 wherein converting the voltages in the d-q-domain to voltages in the time domain comprises converting the voltages in the d-q-domain to voltages in the time domain using an inverse Park transform.

7. An apparatus for controlling a stepper motor, the apparatus comprising:
   a stepper motor driven from a stepper motor driver circuit;
   a stepper angle generator circuit coupled to a user step input and user speed input, the stepper angle generator circuit having an output;
   a current sensing and a measuring circuit to measure currents flowing in coils of the stepper motor;
   a Park transform circuit coupled to the current sensing and measuring circuits and to the output of the stepper angle generator circuit to convert the measured currents to currents in a d-q domain;
   a current controller circuit coupled to the output of the Park transform circuit to generate voltages in the d-q domain from the currents in the d-q domain and reference currents in the d-q domain and a time domain;
   an inverse Park transform circuit coupled to the output of the current controller and to the output of the stepper angle generator circuit to transform the voltages in the d-q-domain to voltages in the time domain;
   a pulse width modulator circuit driven from the inverse Park transform circuit; and
   a reference current generator circuit configured to determine a reference current to set a drive current for the stepper motor as a function of the speed of the stepper motor, an output of the park transform circuit, and an output of the current controller circuit, wherein the reference current is fed back to the current controller circuit.

* * * * *